(12) United States Patent
Doh

(10) Patent No.: US 7,132,034 B2
(45) Date of Patent: Nov. 7, 2006

(54) APPARATUS FOR ETCHING A GLASS SUBSTRATE

(75) Inventor: Yong Il Doh, Taegu-Kwangyukshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/689,622

(22) Filed: Oct. 22, 2003

(65) Prior Publication Data

US 2004/0079483 A1    Apr. 29, 2004

Related U.S. Application Data

(60) Division of application No. 09/556,462, filed on Apr. 24, 2000, now Pat. No. 6,675,817, which is a continuation-in-part of application No. 09/039,438, filed on Mar. 16, 1998.

(30) Foreign Application Priority Data

Apr. 23, 1999   (KR) .............................. 1999-14632

(51) Int. Cl.
B44C 1/22       (2006.01)
C03C 15/00      (2006.01)
C03C 25/68      (2006.01)
C23F 1/00       (2006.01)
H01L 21/306     (2006.01)

(52) U.S. Cl. .................... 156/345.11; 216/87; 216/97

(58) Field of Classification Search ........... 156/345.11, 156/345.15, 345.16; 134/113, 1; 216/23, 216/97, 87

See application file for complete search history.

(56) References Cited

U.S. PATENT DOCUMENTS

| | | | |
|---|---|---|---|
| 3,411,999 A | * | 11/1968 | Weinberg |
| 3,481,687 A | * | 12/1969 | Fishman |
| 3,489,624 A | * | 1/1970 | Lake et al. |
| 3,520,724 A | * | 7/1970 | Massa |
| 3,556,161 A | * | 1/1971 | Roberts ........................ 264/41 |
| 3,661,660 A | * | 5/1972 | Wessells et al. ............ 430/309 |
| 3,767,491 A | * | 10/1973 | Chough |
| 3,871,395 A | * | 3/1975 | Murry |
| 3,964,957 A | * | 6/1976 | Walsh |
| 4,482,425 A | | 11/1984 | Battey ........................ 156/637 |
| 4,715,686 A | | 12/1987 | Iwashita et al. ........ 350/339 R |
| 4,826,556 A | | 5/1989 | Kobayashi .................. 156/345 |
| 4,953,952 A | | 9/1990 | Okumura et al. ........... 350/337 |
| 4,971,654 A | * | 11/1990 | Schnegg et al. ............ 438/752 |
| 4,980,017 A | | 12/1990 | Kaji et al. ................... 156/642 |
| 4,985,306 A | * | 1/1991 | Morizane et al. |
| 5,000,795 A | | 3/1991 | Chung et al. ................. 134/37 |
| 5,076,305 A | * | 12/1991 | Williams |
| 5,082,518 A | | 1/1992 | Molinaro .................... 156/345 |

(Continued)

FOREIGN PATENT DOCUMENTS

DE          1 920 009       10/1970

(Continued)

*Primary Examiner*—Parviz Hassanzadeh
*Assistant Examiner*—Roberts Culbert
(74) *Attorney, Agent, or Firm*—McKenna Long & Aldridge LLP

(57) ABSTRACT

In an apparatus for etching a glass substrate according to the present invention, impurities that are attached to the surface of a glass substrate, which are formed by assembling a color filter substrate and a TFT substrate provided in the etching bath filled with etchant, are removed by using ultrasonic oscillation generated from an ultrasonic oscillator, by which a glass substrate having uniform thickness and surface is obtained.

17 Claims, 2 Drawing Sheets

U.S. PATENT DOCUMENTS

| | | | | |
|---|---|---|---|---|
| 5,088,510 A | * | 2/1992 | Bannon | 134/105 |
| 5,112,453 A | | 5/1992 | Behr et al. | 204/129.2 |
| 5,188,701 A | * | 2/1993 | Hirano | |
| 5,251,980 A | | 10/1993 | Hiraoka et al. | 374/7 |
| 5,277,715 A | | 1/1994 | Cathey | 134/2 |
| 5,364,510 A | * | 11/1994 | Carpio | |
| 5,456,788 A | | 10/1995 | Barbee et al. | 156/345.16 |
| 5,540,784 A | | 7/1996 | Ranes | 134/10 |
| 5,654,057 A | | 8/1997 | Kitayama et al. | 428/64.1 |
| 5,788,871 A | | 8/1998 | Huh | 216/84 |
| 5,818,559 A | | 10/1998 | Yoshida | 349/122 |
| 5,819,434 A | | 10/1998 | Herchen et al. | 34/232 |
| 6,146,469 A | * | 11/2000 | Toshima | 134/37 |
| 6,399,517 B1 | * | 6/2002 | Yokomizo et al. | |

FOREIGN PATENT DOCUMENTS

| | | | |
|---|---|---|---|
| DE | 1920009 | | 10/1970 |
| FR | 1 200 180 | | 12/1959 |
| FR | 1200180 | | 12/1959 |
| GB | 2323334 | * | 9/1998 |
| GB | 2323334 A | * | 9/1998 |
| JP | 55130839 A | * | 10/1980 |
| JP | 60-163435 | * | 8/1985 |
| JP | 63108725 A | * | 5/1988 |
| JP | 2-76228 | * | 3/1990 |
| JP | 5-29297 | * | 2/1993 |
| JP | 5-102119 | * | 4/1993 |
| JP | 5-109685 | * | 4/1993 |
| JP | 09-064011 | | 3/1997 |
| JP | 11006081 A | * | 1/1999 |

* cited by examiner

APPARATUS FOR ETCHING A GLASS SUBSTRATE

This application is a divisional of prior application Ser. No. 09/556,462, filed Apr. 24, 2000.

This application is a continuation-in-part of U.S. application Ser. No. 09/039,438, entitled "Etching Apparatus," filed Mar. 16, 1998, which is related to, and incorporates by reference, U.S. application Ser. No. 09/002,037, entitled "Method of Fabricating a Substrate," filed Dec. 31, 1997. This application also claims the benefit of Korea Application No. 1999-14632 filed on Apr. 23, 1999. The entirety of both the parent U.S. Applications and the priority Korean Application are incorporated herein by reference.

BACKGROUND OF THE INVENTION

1. Field of the Invention

The present invention relates to an etching apparatus, and more particularly, to an apparatus for etching a substrate uniformly by using ultrasonic oscillation.

2. Description of the Related Art

As a display device for a television and a personal computer, a large sized cathode ray tube (CRT) display device is commonly used. However, since the screen must be separated from the electron gun by more than a predetermined distance for a large size screen CRT, the volume of the device is increased. Thus, such a CRT cannot be applied to a low weight, small size, and a low power consumption electronic device, such as a wall-mountable television, a portable television, and a notebook computer.

For a small and light display device, flat panel devices such as a liquid crystal display device (LCD), plasma display panel (PDP), electroluminescent display (ELD) and vacuum fluorescent display (VFD) have been introduced recently. Among the above flat panel display devices, the LCD has been researched extensively for good picture quality and low power consumption. The LCD-applied portable television and notebook computer have been introduced in the market, but there are problems to be solved in such LCD-applied devices. In particular, size and weight are important factors to be considered for the LCD.

For a small size and light LCD, there are several available methods for reducing the size and weight of the LCD element. However, the driving circuit and the thin film transistor, which are necessary elements of the LCD, are so thin that reducing these elements will not affect the weight in any significant manner. On the other hand, it is possible to reduce the weight of the LCD element by reducing the weight of the glass substrate that is a basic element of the LCD. Specifically, since the glass substrate is a heavy element of the LCD, methods of reducing the weight of the glass substrate have been continuously researched.

For a glass substrate of a given surface area, a light glass substrate requires a thin glass substrate. However, known methods of thinning the glass substrate cause damage including internal imperfections and surface roughness. Thus, the mechanical strength of the glass substrate is weakened, and the image quality of the LCD is accordingly deteriorated.

Conventionally, the most common method of reducing the weight of the glass substrate is to etch the surface of the glass substrate by soaking the substrate in a container having an etchant. In this method, however, the substrate is often not etched uniformly because of the non-uniform surface of the substrate. Further, the impurities generated during the etching process often attach to the surface of the substrate so that the resulting surface becomes even rougher.

To solve the aforementioned problems, the substrate is placed in a container having an etchant and then bubbles are generated and directed through a porous plate to the surface of the substrate in order to remove the impurities attached to the surface of the substrate, and a fresh etchant is applied to the surface of the substrate.

FIG. 1 is a sectional view showing a related art apparatus for etching a glass substrate that is etched in a method employing nitrogen bubbles.

For reference, the related art was filed by the Applicant of the present invention as U.S. patent application Ser. No. 09/389,959. Therefore, the present invention is an improvement of the related art.

As shown in FIG. 1, a teflon cassette 117 maintaining fixed spaces is formed in the interior of etching bath 111 filled with etchant 121. The height of the etchant 121 is lower than that of the etching bath 111 so that the etchant cannot flow out to the outside. In the teflon cassette 117, a substrate 119 including a color filter substrate and a thin film transistor (TFL) substrate is supported by a support means (not shown in the figures). A nitrogen bubble generation pipe 113 is formed on the lower portion of the teflon cassette 117 so that nitrogen bubbles 123 are supplied through a plurality of the nitrogen bubble generation tubes 115. The supplied nitrogen bubbles 123 rise along the surface of the substrate 119 so that the impurities generated during the photolithography process and adhering to the substrate surface are removed. In this type of etching process, the extent of etching of the substrate 119 depends on, and therefore can be determined by, the temperature obtained from an exothermic reaction that is generated between the etchant 121 and the substrate 119.

In this related art method, however, since the bubbles, necessarily having different sizes, are applied on the upper portion and lower portion of the substrate, there is a resultant thickness difference between the upper portion and lower portion. As a result, the substrate is still easily damaged even by light force during the LCD process because of the non-uniformity of the thickness of the substrate. Further, the substrate must be soaked for a long period, for example, scores of minutes, to etch the substrate sufficiently. Thus, the processing cost is increased in this method.

SUMMARY OF THE INVENTION

Accordingly, the present invention is directed to an apparatus for etching a glass substrate that substantially obviates one or more problems due to limitations and disadvantages of the related art.

An object of the present invention is to provide an apparatus for etching a glass substrate having a thin thickness and uniform surface.

To achieve the objects and in accordance with the purpose of the invention, as embodied and broadly described herein, the apparatus for etching the glass substrate comprises an etching bath filled with etchant, a teflon cassette in the interior of the etching bath, said teflon cassette supporting a substrate including a color filter substrate and a TFT substrate, and an ultrasonic oscillator generating ultrasonic vibration, attached to the exterior of the etching bath.

According to the present invention, impurities attached on the glass substrate can be removed during the etching process, before the photolithography process and without a special impurity removal. After assembling a color filter substrate and TFT substrate, when a glass substrate is etched, impurities generated during the etching process attached on the surface of the glass substrate are removed so that the surface of the glass substrate will be uniform.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the written description serve to explain the principles of the invention.

In the drawings.

DETAILED DESCRIPTION OF THE INVENTION

Hereinafter, the apparatus for etching a glass substrate of the present invention is explained in detail by the accompanying drawings.

Figure 1:
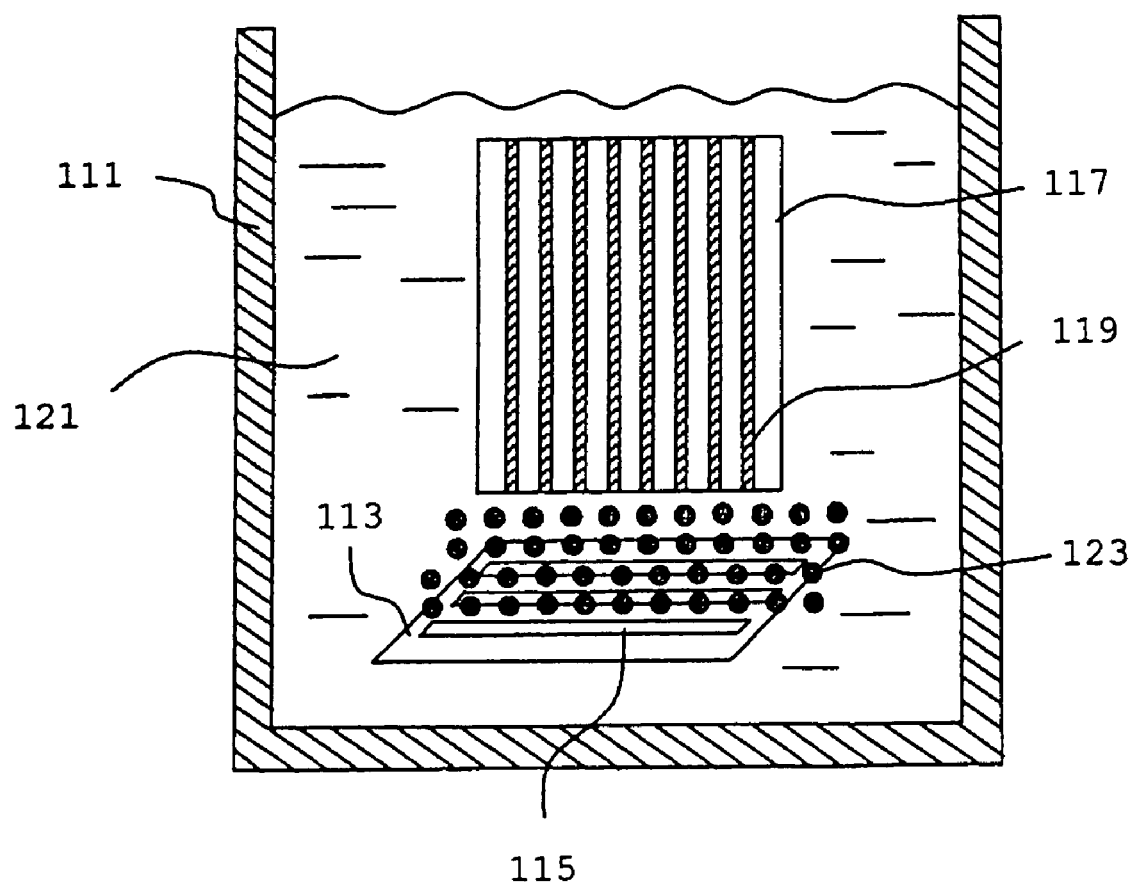
FIG. 1 is a sectional view showing the apparatus for etching a glass substrate of the related art.
Figure 2:
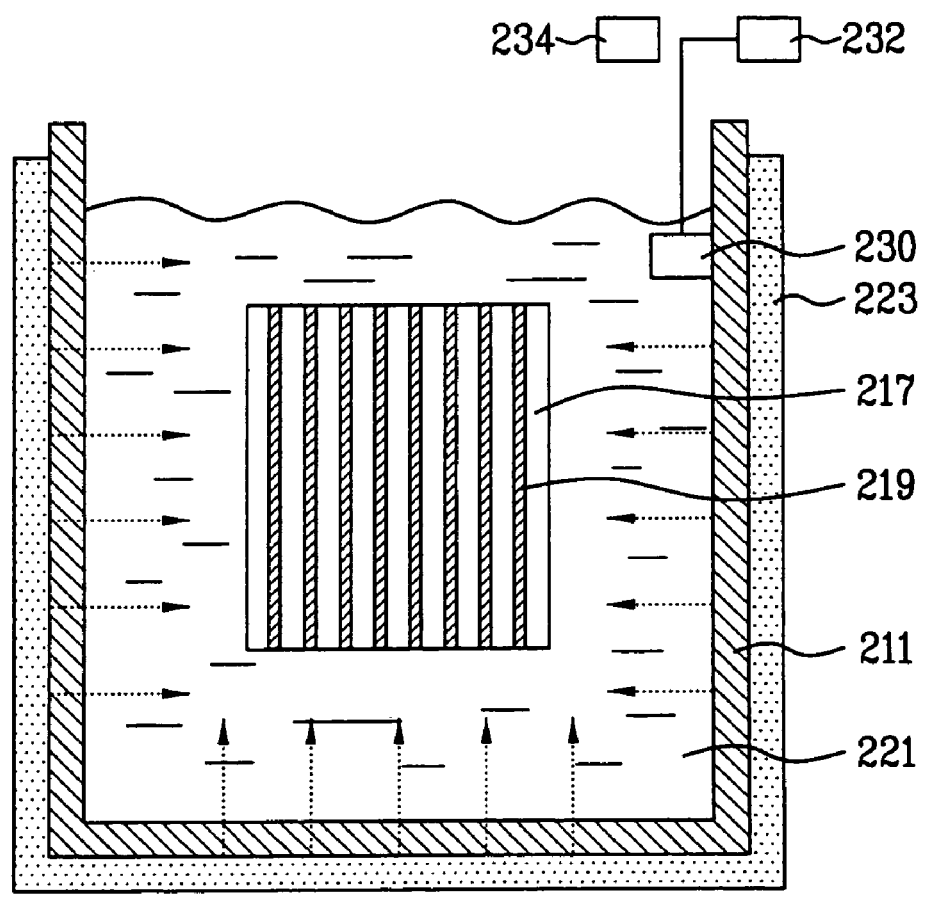
FIG. 2 is a sectional view showing the apparatus for etching a glass substrate according to the present invention.

FIG. 2 is a sectional view showing the apparatus for etching a glass substrate according to the present invention. As shown in the figure, the etching apparatus according to the present invention comprises an etching bath 211 filled with etchant 221, a Teflon cassette 217 in the interior of the etching bath 211, said cassette 217 supporting a substrate 219 including a color filter substrate and a TFT substrate and an ultrasonic oscillator 223 that is generating ultrasonic vibration and is attached to the exterior of the etching bath 211, and which removes impurity by ultrasonic oscillation. In another aspect of the present invention, the ultrasonic oscillator 223 may be located within the interior of the etching bath 211.

The height of the etchant 221 is lower than that of the etching bath 211 so that the etchant 221 cannot flow out to the outside. The etchant 221 is typically a hydrofluoric acid (HF) solution. The substrate 219 including a color filter substrate and a TFT substrate is supported by a support means (not shown in the figures) maintaining fixed spaces.

Ultrasonic vibration (represented by dotted line arrows in the figures) generated by the ultrasonic oscillator 223 removes impurities attached on the surface of the substrate 219, wherein a shock effect generated by the ultrasonic oscillation is provided on the surface of the substrate 219 so that the impurities originated from photolithography processes are removed from the surface of the substrate 219.

Herein, the etching processes using the apparatus of the present invention for etching a glass substrate will be described.

DETAILED DESCRIPTION OF A PREFERRED EMBODIMENT (1) The etching bath 211 is filled with etchant 221.

(2) The teflon cassette 217 supporting the assembled glass substrate 219 is completely submerged in the etchant 221.

(3) After the teflon cassette 217 is completely submerged in the etchant 221, an ultrasonic oscillator 223 is oscillated within 30 seconds.

(4) In order to reduce operation time by heating effect, the temperature of the etchant is raised about 5–10° C.

In one aspect of the present invention, the apparatus may comprise a temperature sensor 230 for measuring the temperature of the etchant. In another aspect of the present invention, the temperature sensor may be installed within the etchant bath. In yet another aspect of the present invention, the apparatus may comprise a thermometer. In still another aspect of the present invention, the apparatus may comprise a control unit 232 for receiving a temperature indicating signal from the temperature sensor and generating an etching termination signal when the temperature signal indicates an etching termination temperature. In one aspect of the present invention, the apparatus may comprise a thermostat for signaling a temperature rise of the etchant. In still another aspect of the present invention, the apparatus may comprise an indicator 234 for displaying the temperature monitored by the temperature sensor 230.

As previously known, the ultrasonic vibration used in the present invention is widely used in fish-detecting depth measurement apparatuses, cleaning apparatuses, ultrasonic process apparatuses, in the medical and physical therapy field, and other end use technologies. In the present invention, the ultrasonic vibration separates the impurities produced during photolithography processes from the surface of the substrate, and effectively removes the organic layer formed on the surface of the substrate.

The method of removing impurities using nitrogen bubbles in the related art has a problem generated by the nature of nitrogen bubbles. Also in the method, a bubble generator must be provided in the interior of the etching bath because nitrogen bubbles have to pass the surface of the glass substrate. This structure provides many limitations in the selection of etchant and in the design of etching apparatus.

On the other hand, impurities can be separated from the surface of the substrate through ultrasonic oscillation without contacting directly on the glass substrate in the present invention. Therefore, maximum simplification of the etching apparatus is obtained.

In the case that the desired thickness of the substrate after etching is very thin, the present invention can be prove more effective. That is, ultrasonic oscillation can be easily controlled mechanically, and the present invention can thereby prevent damage to the substrate, even when etching of long duration is necessary, as in the case of producing a very thin substrate.

Consequently, since the apparatus for etching a glass substrate of the present invention employs ultrasonic vibration in order to remove from the glass substrate the impurities generated during the photolithography process, a glass substrate is readily processed to have a uniformly thin thickness and a uniformly flat surface.

Also, simplicity of manufacturing processes is obtained because no special processes are needed before the photolithography processes to remove impurities attached on the surface of the glass substrate.

It will be apparent to those skilled in the art that various modifications can be made in the multi-domain liquid crystal display device and method of manufacturing of the present invention without departing from the spirit or scope of the invention. Thus, it is intended that the present invention covers the modifications and variations of this invention provided they come within the scope of the appended claims and their equivalents.

What is claimed is:

1. An apparatus for etching a glass substrate, comprising:
   an etching bath containing an etchant;
   a holder for supporting said glass substrate in the etching bath;
   an ultrasonic oscillator generating ultrasonic vibration on opposite surfaces of said substrate; and
   wherein the ultrasonic oscillator is located in the interior of the etching bath and the ultrasonic oscillator completely surrounds the bottom and sides of the etching bath.

2. The apparatus for etching a glass substrate of claim 1, wherein said etchant comprises hydrofluoric acid.

3. The apparatus for etching a glass substrate of claim 1, wherein said holder comprises acid-resistant material.

4. The apparatus for etching a glass substrate of claim 3, wherein said acid resistant material comprises polytetrafluoroethylene.

5. The apparatus for etching a glass substrate of claim 1, further comprising a thermometer for measuring the temperature of the etchant.

6. The apparatus for etching a glass substrate of claim 1, further comprising a thermostat for signaling a specific temperature rise of said etchant.

7. The apparatus for etching a glass substrate of claim 1, wherein said holder supports a plurality of glass substrates.

8. The apparatus for etching a glass substrate of claim 1, wherein said holder is located in an interior of said etching bath.

9. An apparatus for etching a glass substrate, comprising:
   an etching bath filled with an etchant;
   a holder for supporting said glass substrate in the etching bath;
   an ultrasonic oscillator generating ultrasonic vibration on opposite surfaces of said substrate, wherein the ultrasonic oscillator is located in the interior of the etching bath and the ultrasonic oscillator completely surrounds the bottom and sides of the etching bath; and
   an indicator displaying a temperature of the etching bath.

10. The apparatus for etching a glass substrate of claim 9, wherein said etchant comprises hydrofluoric acid.

11. The apparatus for etching a glass substrate of claim 9, wherein said holder comprises acid resistant material.

12. The apparatus for etching a glass substrate of claim 11, wherein said acid resistant material comprises polytetrafluoroethylene.

13. The apparatus for etching a glass substrate of claim 9, wherein said holder contains a plurality of glass substrates.

14. The apparatus for etching a glass substrate of claim 9, wherein said holder is located in an interior of said etching bath.

15. The apparatus for etching a glass substrate of claim 9, further comprising a temperature sensor installed in said etching bath, wherein the temperature sensor monitors the temperature of the etching bath.

16. The apparatus for etching a glass substrate of claim 15, further comprising a control unit for receiving a temperature indicating signal from said temperature sensor and generating an etching termination signal when the temperature signal indicates an etching termination temperature.

17. The apparatus for etching a glass substrate of claim 16, wherein said control unit determines said etching termination temperature from said temperature indicating signal.

* * * * *